US012601719B2

(12) United States Patent
Kupser et al.

(10) Patent No.: US 12,601,719 B2
(45) Date of Patent: Apr. 14, 2026

(54) COLUMN DEVICE

(71) Applicant: Roche Diagnostics Operations, Inc., Indianapolis, IN (US)

(72) Inventors: Peter Kupser, Starnberg (DE); Andreas Leinenbach, Peissenberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 291 days.

(21) Appl. No.: 18/447,604

(22) Filed: Aug. 10, 2023

(65) Prior Publication Data

US 2023/0384269 A1 Nov. 30, 2023

Related U.S. Application Data

(63) Continuation of application No. PCT/EP2022/053354, filed on Feb. 11, 2022.

(30) Foreign Application Priority Data

Feb. 12, 2021 (EP) ..................................... 21156784

(51) Int. Cl.
    *G01N 30/60*     (2006.01)
    *G01N 30/16*     (2006.01)
    (Continued)

(52) U.S. Cl.
    CPC ......... *G01N 30/16* (2013.01); *G01N 30/6047* (2013.01); *G01N 30/6078* (2013.01);
    (Continued)

(58) Field of Classification Search
    CPC .............. G01N 30/16; G01N 30/6047; G01N 30/6078; G01N 35/00732;
    (Continued)

(56) References Cited

U.S. PATENT DOCUMENTS 4,089,207 A * 5/1978 Patton ................ G01N 30/6091
                                                    219/535
4,451,364 A * 5/1984 Higgins ............. G01N 30/6026
                                                    285/109

(Continued)

FOREIGN PATENT DOCUMENTS

CA           953530 A     8/1974
FR        2508644 A1    12/1982
          (Continued)

OTHER PUBLICATIONS

Written Opinion of the International Searching Authority, European Patent Office, International Patent Application No. PCT/EP2022/053354, Aug. 18, 2022, 7 pages.

(Continued)

*Primary Examiner* — David J Bolduc
(74) *Attorney, Agent, or Firm* — Taft Stettinius & Hollister LLP

(57) ABSTRACT

A column device for an automatic analyser. The automatic analyzer comprises a high performance liquid chromatography (HPLC) module. The HPLC module comprises a fixation device configured to automatically fix and release a chromatographic column. The column device comprises a column jacket and a capillary. The capillary comprises predetermined dimensions and is disposed within the column jacket. The column device is configured to be installed at the HPLC module using the fixation device. Further, an automatic analyzer is disclosed.

20 Claims, 1 Drawing Sheet

(51) Int. Cl.
  G01N 35/00        (2006.01)
  G01N 30/02        (2006.01)

(52) U.S. Cl.
  CPC . G01N 35/00732 (2013.01); G01N 2030/027 (2013.01); G01N 2030/167 (2013.01); G01N 2035/00772 (2013.01); G01N 2035/00851 (2013.01); G01N 2035/00891 (2013.01)

(58) Field of Classification Search
  CPC ....... G01N 2030/027; G01N 2030/167; G01N 2035/00772; G01N 2035/00851; G01N 2035/00891; G01N 2030/8881
  See application file for complete search history.

(56)                    References Cited

U.S. PATENT DOCUMENTS

| | | | | |
|---|---|---|---|---|
| 4,732,672 | A * | 3/1988 | Kiang | G01N 30/22 |
| | | | | 248/200.1 |
| 6,193,286 | B1 * | 2/2001 | Jones | G01N 30/6004 |
| | | | | 285/353 |
| 9,442,098 | B2 * | 9/2016 | Thorson | G01N 33/0006 |
| 9,470,346 | B2 * | 10/2016 | Tomida | G01N 30/6039 |
| 2002/0020670 | A1 * | 2/2002 | Petro | G01N 30/466 |
| | | | | 210/656 |
| 2002/0190001 | A1 * | 12/2002 | Petro | G01N 35/085 |
| | | | | 210/729 |
| 2006/0213824 | A1 * | 9/2006 | Higgins | B01D 15/22 |
| | | | | 210/198.2 |
| 2007/0084982 | A1 | 4/2007 | Martone et al. | |
| 2008/0064110 | A1 * | 3/2008 | Elizarov | C07B 59/00 |
| | | | | 436/43 |
| 2010/0154207 | A1 * | 6/2010 | Ford | G01N 30/6004 |
| | | | | 29/700 |
| 2011/0290731 | A1 * | 12/2011 | Ozbal | G01N 35/025 |
| | | | | 210/656 |
| 2014/0130580 | A1 * | 5/2014 | Mcadams | B01L 3/563 |
| | | | | 285/386 |
| 2015/0027203 | A1 * | 1/2015 | Trainoff | G01N 21/47 |
| | | | | 356/337 |
| 2016/0231296 | A1 | 8/2016 | Dressler et al. | |
| 2019/0265215 | A1 | 8/2019 | Xie et al. | |
| 2020/0386725 | A1 * | 12/2020 | Ozbal | G01N 30/82 |
| 2022/0050091 | A1 * | 2/2022 | Sugiyama | G01N 30/8658 |
| 2022/0082532 | A1 * | 3/2022 | Patel | G01N 30/88 |
| 2022/0091079 | A1 * | 3/2022 | Patel | G01N 30/52 |
| 2022/0410122 | A1 * | 12/2022 | Fan | B01J 20/3282 |

FOREIGN PATENT DOCUMENTS

| | | |
|---|---|---|
| JP | H07-239325 A | 9/1995 |
| JP | 2008-224559 A | 9/2008 |
| JP | 2020-94817 A | 6/2020 |
| WO | 1992-04958 A1 | 4/1992 |
| WO | 2018173214 A1 | 9/2018 |

OTHER PUBLICATIONS

International Preliminary Report on Patentability, The International Bureau of WIPO, International Patent Application No. PCT/EP2022/053354, Aug. 24, 2023, 8 pages.
Japanese Office Action; Japanese Patent Office; Japanese Patent Application No. 2023-547447; Mar. 15, 2024; 5 pages.
International Search Report issued Apr. 29, 2022, in Application No. PCT/EP2022/053354, 3 pp.
Japanese Office Action; Japanese Patent Office; Japanese Patent Application No. 2024-161128; Jun. 11, 2025; 3 pages.

* cited by examiner

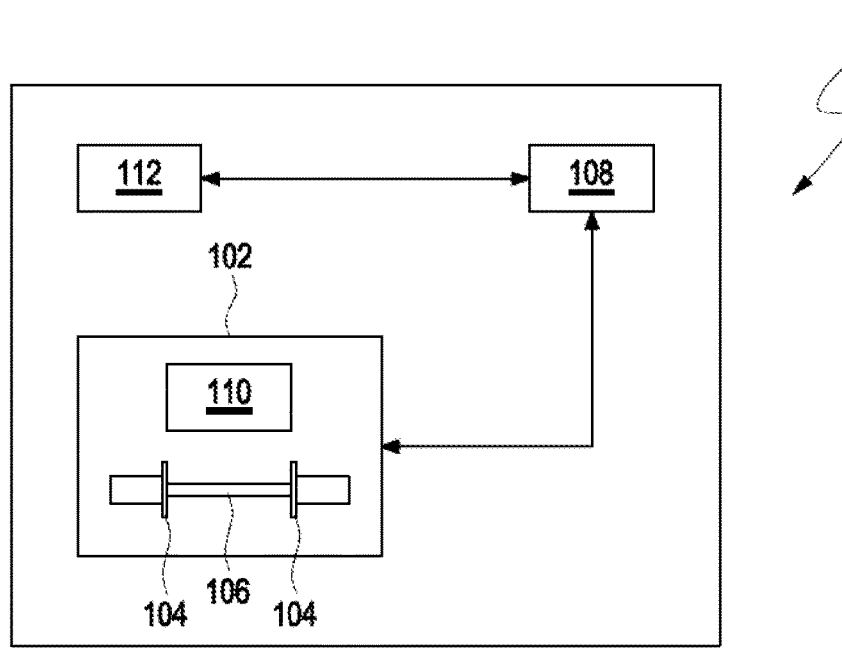
Fig. 1
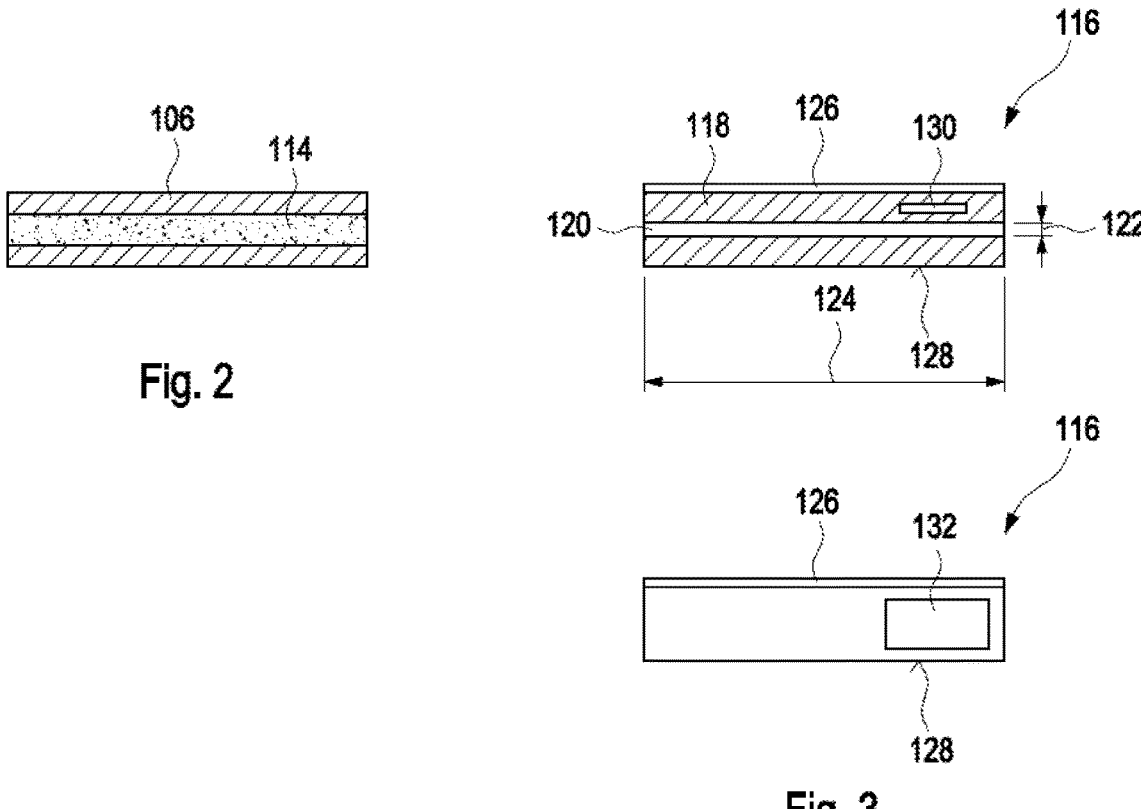
Fig. 2
Fig. 3

COLUMN DEVICE

CROSS-REFERENCE TO RELATED APPLICATIONS

This application is a continuation of International Patent Application No. PCT/EP2022/053354, filed 11 Feb. 2022, which claims priority to European Patent Application No. 21156784.7, filed 12 Feb. 2021, the disclosures of which are hereby incorporated by reference in their entirety.

TECHNICAL FIELD

The present disclosure relates to a column device for an automatic analyzer and to an automatic analyzer comprising a column device.

BACKGROUND

Automatic analyzers are configured to obtain a measurement value from a sample. An automatic analyzer is operable to determine via various chemical, biological, physical, optical or other technical procedures a parameter value of the sample or a component thereof. An automatic analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An automatic analyzer may comprise units assisting with the pipetting, dosing, and mixing of samples and/or reagents.

The automatic analyzer may comprise a process and detection system whose workflow is optimized for certain types of analysis. Examples of such analyzers are clinical chemistry analyzers, coagulation chemistry analyzers, immunochemistry analyzers, urine analyzers, nucleic acid analyzers, and mass spectrometry analyzers, used to detect the result of chemical or biological reactions or to monitor the progress of chemical or biological reactions.

Such automatic analyzers allow to increase the number of analytical processes and obtainable measurements values. For this reason, such automatic diagnostic analyzers use several processing stations for processing several samples provided in reaction vessels at the same time. For example, 2 to 8 or even more different processing stations are present with such an automatic analyzer for preparing, processing, and analyzing the respective samples.

One of the processing stations of the automatic analyzer may be a high performance liquid chromatography (HPLC) module coupled to a detection unit. Said detection unit can be for example a/an UV-, chemiluminescence-, electrochemiluminescence-, mass spectrometry- or other suitable detector. HPLC is a technique in analytical chemistry used to separate, identify, and quantify each component in a mixture. It relies on pumps to pass a pressurized liquid solvent containing the sample mixture through a column filled with a solid adsorbent material. Each component in the sample interacts slightly differently with the adsorbent material, causing different adsorption times on the column material for the different components and leading to the separation of the components as they flow out of the column at different times. The identification and quantification of the separated components is carried out by one or more detectors arranged downstream of the column.

In HPLC applications, the HPLC system itself (without the separation column) can be tested for: column independent chromatographic performance using a dispersion test case for possible instrument-dependent peak broadening, check of system volumes from pump to detector and injector to detector, and column independent leakage of the system. In order to do so an inert analyte, which will not be retained by any surface in the system, is injected and detected. In order to check that the pump can work within its specifications, such as its optimal pressure operating range, a connection capillary is introduced. The backpressure of this capillary compensates for reduced system backpressure without a column.

This procedure involves some drawbacks. A user has to manually change the setup of the system by removing the column and installing an additional capillary to bypass the column. This process is not tool free. It is a manual process which is error prone. Only an expert can avoid dead volumes in the system. The volume and backpressure of the capillary is prone to error by manufacturing tolerances and the manual installation process. The analysis of experimental data requires an expert, is time-consuming and error prone. The user has to choose (if it exists) or manufacture an optimal capillary with appropriate dimensions for an individual dedicated LC flow path.

SUMMARY

Although the embodiments of the present disclosure are not limited to specific advantages or functionality, it is noted that in accordance with the present disclosure a column device is provided that aims to at least reduce or overcome these drawbacks and particularly aim to provide a defined measurement tool which is independent of column performance.

In accordance with one embodiment of the present disclosure, a column device for an automatic analyzer is provided, wherein the automatic analyzer comprises a high performance liquid chromatography (HPLC) module, wherein the HPLC module comprises a fixation device configured to automatically fix and release a chromatographic column, wherein the column device comprises a column jacket and a capillary, wherein the capillary comprises predetermined dimensions and is disposed or located within the column jacket, and wherein the column device is configured to be installed at the HPLC module using the fixation device.

In accordance with another embodiment of the present disclosure, an automatic analyzer is provided comprising a high performance liquid chromatography (HPLC) module, wherein the HPLC module comprises a fixation device configured to automatically fix and release a chromatographic column, and a column device according to an embodiment of the present disclosure, wherein the automatic analyzer is configured to carry out a diagnosis process of the HPLC module with the column device fixed by the fixation device.

Thus, a defined measurement tool is provided. It consists of a dummy column mimick in which no column but a capillary is incorporated. It is configured to be used similar to the chromatographic columns used on the automatic analyzer. Particularly, the fixation device is not a manual device but an automatic device and, therefore, is simple and tool-free. Every field service engineer or even the user can easily install the column device in order to enable the system to automatically perform a self-check. Due to the pump being able to perform at its specified pressure range without a column, it is possible to perform automated self-checks including analysis of data and judgment of reliability for: column independent chromatographic performance using a dispersion test case for possible instrument-dependent peak broadening, check of system volumes from pump to detector and injector to detector, column independent leakage of system, and pump characteristics like mixing accuracy and precision.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which:

FIG. 1 shows a schematic illustration of an automatic analyzer according to an embodiment of the present disclosure;

FIG. 2 shows a cross-sectional view of a chromatographic column according to an embodiment of the present disclosure; and FIG. 3 shows a cross-sectional view of a column device in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any regarding alternative embodiments of the disclosure, without any regarding the scope of the disclosure and without any regarding the possibility of combining the features introduced in such way with other optional or non-optional features of the disclosure.

The term "automatic analyzer" as used herein is a broad term and is to be given its ordinary and customary meaning to a person of ordinary skill in the art and is not to be limited to a special or customized meaning. The term specifically may refer, without limitation, to any apparatus or apparatus component operable to execute one or more processing steps/workflow steps on one or more chemical and/or biological samples. The term "processing step" thereby refers to physically executed processing steps such as centrifugation, aliquotation, sample analysis and the like. The term "analyzer" covers pre-analytical sample work-cells, post-analytical sample work-cells and also analytical work-cells. Non-limiting examples for automatic analyzers are clinical chemistry analyzers, coagulation chemistry analyzers, immunochemistry analyzers, urine analyzers, and nucleic acid analyzers, used to detect the result of chemical or biological reactions or to monitor the progress of chemical or biological reactions. One of the processing stations of the automatic analyzer is a HPLC module.

The term "high-performance liquid chromatography (HPLC) module" as used herein is a broad term and is to be given its ordinary and customary meaning to a person of ordinary skill in the art and is not to be limited to a special or customized meaning. The term specifically may refer, without limitation, to an instrument, an apparatus or a device configured to separate, identify, and quantify each component in a mixture. The term is synonymously used with the term "HPLC instrument". It relies on pumps to pass a pressurized liquid solvent containing the sample mixture through a column filled with a solid adsorbent material. Each component in the sample interacts slightly differently with the adsorbent material, causing different flow rates for the different components and leading to the separation of the components as they flow out of the column. HPLC can be used for manufacturing (e.g., during the production process of pharmaceutical and biological products), legal (e.g., detecting performance enhancement drugs in urine), research (e.g., separating the components of a complex biological sample, or of similar synthetic chemicals from each other), and medical (e.g., detecting vitamin D levels in blood serum) purposes. Chromatography can be described as a mass transfer process involving adsorption. HPLC relies on pumps to pass a pressurized liquid and a sample mixture through a column filled with adsorbent, leading to the separation of the sample components. The active component of the column, the adsorbent, is typically a granular material made of solid particles (e.g., silica, polymers, etc.), 2-50 μm in size. The components of the sample mixture are separated from each other due to their different degrees of interaction with the adsorbent particles. The pressurized liquid is typically a mixture of solvents (e.g., water, acetonitrile and/or methanol) and is referred to as a "mobile phase". Its composition and temperature play a major role in the separation process by influencing the interactions taking place between sample components and adsorbent. These interactions are physical in nature, such as hydrophobic (dispersive), dipole-dipole and ionic, most often a combination. HPLC is distinguished from traditional ("low pressure") liquid chromatography because operational pressures are significantly higher (50-350 bar), while ordinary liquid chromatography typically relies on the force of gravity to pass the mobile phase through the column. Due to the small sample amount separated in analytical HPLC, typical column dimensions are 2.1-4.6 mm diameter, and 30-250 mm length. Also HPLC columns are made with smaller adsorbent particles (2-50 μm in average particle size). This gives HPLC superior resolving power (the ability to distinguish between compounds) when separating mixtures, which makes it a popular chromatographic technique. The schematic of an HPLC module or HPLC instrument typically includes a degasser, sampler, pumps, and a detector. The sampler brings the sample mixture into the mobile phase stream which carries it into the column. The pumps deliver the desired flow and composition of the mobile phase through the column. The detector generates a signal proportional to the amount of sample component emerging from the column, hence allowing for quantitative analysis of the sample components. A digital microprocessor and user software control the HPLC module and provide data analysis. Some models of mechanical pumps in an HPLC module can mix multiple solvents together in ratios changing in time, generating a composition gradient in the mobile phase. Various detectors are in common use, such as UV/Vis, photodiode array (PDA) or based on mass spectrometry. Most HPLC instruments also have a column oven that allows for adjusting the temperature at which the separation is performed.

The operation principle is as follows. The sample mixture to be separated and analyzed is introduced, in a discrete small volume (typically microliters), into the stream of mobile phase percolating through the column. The components of the sample move through the column at different velocities, which are a function of specific physical interactions with the adsorbent (also called stationary phase). The velocity of each component depends on its chemical nature, on the nature of the stationary phase (column) and on the composition of the mobile phase. The time at which a specific analyte elutes (emerges from the column) is called its retention time. The retention time measured under particular conditions is an identifying characteristic of a given analyte. Many different types of columns are available, filled with adsorbents varying in particle size, and in the nature of their surface ("surface chemistry"). The use of smaller particle size packing materials requires the use of higher operational pressure ("backpressure") and typically improves chromatographic resolution (the degree of peak separation between consecutive analytes emerging from the column). Sorbent particles may be hydrophobic or polar in nature. Common mobile phases used include any miscible combination of water with various organic solvents (the most common are acetonitrile and methanol). Some HPLC techniques use water-free mobile phases (see normal-phase chromatography below). The aqueous component of the mobile phase may contain acids (such as formic, phosphoric or trifluoroacetic acid) or salts to assist in the separation of the sample components. The composition of the mobile phase may be kept constant ("isocratic elution mode") or varied ("gradient elution mode") during the chromatographic analysis. Isocratic elution is typically effective in the separation of sample components that are very different in their affinity for the stationary phase. In gradient elution the composition of the mobile phase is varied typically from low to high eluting strength. The eluting strength of the mobile phase is reflected by analyte retention times with high eluting strength producing fast elution (=short retention times). A typical gradient profile in reversed phase chromatography might start at 5% acetonitrile (in water or aqueous buffer) and progress linearly to 95% acetonitrile over 5-25 minutes. Periods of constant mobile phase composition may be part of any gradient profile. For example, the mobile phase composition may be kept constant at 5% acetonitrile for 1-3 min, followed by a linear change up to 95% acetonitrile. The chosen composition of the mobile phase (also called eluent) depends on the intensity of interactions between various sample components ("analytes") and stationary phase (e.g., hydrophobic interactions in reversed-phase HPLC). Depending on their affinity for the stationary and mobile phases analytes partition between the two during the separation process taking place in the column. This partitioning process is similar to that which occurs during a liquid-liquid extraction but is continuous, not step-wise. In this example, using a water/acetonitrile gradient, more hydrophobic components will elute (come off the column) late, once the mobile phase gets more concentrated in acetonitrile (i.e., in a mobile phase of higher eluting strength). The choice of mobile phase components, additives (such as salts or acids) and gradient conditions depends on the nature of the column and sample components. Often a series of trial runs is performed with the sample in order to find the HPLC method which gives adequate separation.

The term "chromatographic column" as used herein is a broad term and is to be given its ordinary and customary meaning to a person of ordinary skill in the art and is not to be limited to a special or customized meaning. The term specifically may refer, without limitation, to a tube-shaped device used with a HPLC module. Within this tube-shaped device a material called the stationary phase is fixed. The chromatographic column is used for the separation of components of a mixture. The mixture is dissolved in a fluid called the mobile phase, which carries it through the column, respectively. The different constituents of the mixture have different affinities for the stationary phase. The different molecules stay longer or shorter on the stationary phase, depending on their interactions with its surface sites. So, they travel at different apparent velocities in the mobile fluid, causing them to separate. The separation is based on the differential partitioning between the mobile and the stationary phases. Subtle differences in a compound's partition coefficient result in differential retention on the stationary phase and thus affect the separation. While small-scale columns range from inner diameters of 0.5 cm and withstand pressures of up to 130 MPa, industrial large scale columns reach diameters of up to 2 m and operate at considerable lower pressures (below 1 MPa). While it is favorable to view the packed bed of a column, large scale columns are manufactured from steel due to its superior resilience.

The term "fixation device" as used herein is a broad term and is to be given its ordinary and customary meaning to a person of ordinary skill in the art and is not to be limited to a special or customized meaning. The term specifically may refer, without limitation, to any device that is configured to releasably fix a chromatographic column in its target position at a HPLC module. This term may more specifically refer to a device that automatically fix a chromatographic column in its target position at a HPLC module, i.e., not with manual support by aid of a motor, actuator or any other servo device.

The term "column jacket" as used herein is a broad term and is to be given its ordinary and customary meaning to a person of ordinary skill in the art and is not to be limited to a special or customized meaning. The term specifically may refer, without limitation, to a cover or enclosure of a core or interior of the column device. The column jacket may be made of a solid material. The solid material may be an elastic or rigid material. The column jacket may comprise insulating characteristics.

The term "capillary" as used herein is a broad term and is to be given its ordinary and customary meaning to a person of ordinary skill in the art and is not to be limited to a special or customized meaning. The term specifically may refer, without limitation, to a tube-shaped device having a rather small inner diameter. Its length is usually significantly greater than the inner diameter such as by factor 5, 10, 20 or even more.

The term "dimension" as used herein is a broad term and is to be given its ordinary and customary meaning to a person of ordinary skill in the art and is not to be limited to a special or customized meaning. The term specifically may refer, without limitation, to a size or geometric dimension of the capillary. In chromatography dimension is used to define a capillary because devices with same volume but different dimensions can lead to significant changes in separation behavior. Thus, the dimension particularly includes a length, inner diameter, inner volume, orientation, extension, and cross-sectional shape of the capillary.

The predetermined dimensions may comprise an inner volume and/or backpressure. Thus, the dimensions of the column device are adjustable as appropriate such that its behavior is known and foreseeable. Particularly, the capillary may not only be a so-called restriction capillary providing a predetermined backpressure but may also define the inner volume for an analyte or mobile phase flowing therethrough.

The column device may comprise outer dimensions identical to a chromatographic column usable with the HPLC module. Thus, the column device may be easily integrated into the HPLC module.

The capillary may comprise an inner diameter of 1 μm to 1000 μm. Thus, the capillary comprises an inner diameter revealing good flow characteristics for a self-check of the HPLC module.

The capillary may comprise a length of 10 mm to 50 mm. Thus, the capillary comprises a length revealing good flow characteristics for a self-check of the HPLC module.

In accordance with an embodiment of the present disclosure, the column device can further comprise at least one guiding element configured to insert the column device into the fixation device. For example, the guiding element may allow insertion of the column device by hardcoding supported insertion in the fixation device. Thus, the column device may be exactly inserted into the fixation device such that the final or inserted position of the column device is fixed without any variances.

The term "guiding element" as used herein is a broad term and is to be given its ordinary and customary meaning to a person of ordinary skill in the art and is not to be limited to a special or customized meaning. The term specifically may refer, without limitation, to any device or element configure to allow the column device to be moved to its target position within or at the fixation device. The guiding element may comprise rails, grooves or the like.

The guiding element may be disposed at an outer surface of the column jacket. This facilitates the insertion of the column device.

The column device may further comprise a RFID tag, wherein the RFID tag includes information about column type, manufacturing lot and optionally reference values and/or correction factors of the capillary. Thus, the automatic analyzer may automatically receive technical data concerning the column device by reading the RFID tag with an RFID reader.

The RFID tag may be configured to automatically, typically fully automatically, trigger or enable a diagnosis process of the HPLC module. Thus, as soon as the column device is inserted into the fixation device and the information from the RFID tag are read, a diagnosis process of the HPLC module may be initiated without extensive preparation by the user. For example, the diagnosis process may automatically start after the column device is inserted into the fixation device and the information from the RFID tag are read or may be initiated by a confirmation command from the user.

The column device may further comprise a human readable label including information about the capillary. Thus, the user can easily identify technical data concerning the column device.

In accordance with another embodiment, an automatic analyzer is disclosed. The automatic analyzer comprises a high performance liquid chromatography (HPLC) module. The HPLC module comprises a fixation device configured to automatically fix and release a chromatographic column, and a column device according to any one of the embodiments described before or as will be described hereinafter. The automatic analyzer is configured to carry out a diagnosis process of the HPLC module with the column device fixed by the fixation device.

The automatic analyzer may be configured to provide a flow of and to inject an inert analyte through the capillary. Such an inert analyte will not be retained by any surface in the system and can be detected. In order to check that the pump can work within its specifications, the capillary is introduced. The backpressure of this capillary compensates for reduced system backpressure without a chromatographic column. Particularly, the flow may be adjusted by the amount of inert analyte injected, which in turn may depend on how long the inert analyte is injected.

The term "inert analyte" as used herein is a broad term and is to be given its ordinary and customary meaning to a person of ordinary skill in the art and is not to be limited to a special or customized meaning. The term specifically may refer, without limitation, to any analyte that will not be retained by any surface in the HPLC module and can be detected by a detector of the HPLC module. With other words, the inert analyte is not adsorbed or does not adhere to any surface in the HPLC module and can be detected by a detector of the HPLC module.

The automatic analyzer may be configured to fully automatically carry out the diagnosis process when triggered by the column device. Thus, a self-check of the HPLC module may be carried out without any process steps being carried out by the user.

The term "diagnosis process" as used herein is a broad term and is to be given its ordinary and customary meaning to a person of ordinary skill in the art and is not to be limited to a special or customized meaning. The term specifically may refer, without limitation, to the identification of the nature and cause of a certain phenomenon. In the field of the present disclosure, it is typically used to determine the causes of symptoms, mitigations, and solutions. The term may more particularly refer to any process configured to check the operation characteristics or state of the HPLC module.

The column device may comprise an RFID tag, wherein the automatic analyzer may further comprise an RFID reader and may be configured to carry out the diagnosis process of the HPLC module when identifying the RFID tag. Thus, as soon as the column device is inserted into the fixation device and the information from the RFID tag are read, a diagnosis process of the HPLC module may be initiated without extensive preparation by the user. For example, the diagnosis process may automatically start after the column device is inserted into the fixation device and the information from the RFID tag are read or may be initiated by a confirmation command from the user.

A type of diagnosis process may depend on information stored by the RFID tag. Thus, depending on the information stored by the RFID tag, different diagnosis processes may be initiated revealing different diagnosis results.

The automatic analyzer may further comprise a display device configured to display information to a user depending on information stored by the RFID tag. Thus, the user may also read the information stored by the RFID tag. This can also support the operator by providing information on the instrument and guidance on necessary actions such as maintenance.

The automatic analyzer may be configured to trigger predetermined actions of the HPLC module, particularly release the HPLC module for routine operation, trigger maintenance of the HPLC module, and/or trigger predictive maintenance the HPLC module. Thus, a user friendly automatic process for checking the HPLC module is provided.

The automatic analyzer may be configured to automatically evaluate diagnosis data obtained from the diagnosis process. Thus, the automatic analyzer automatically provides the user with information on the status of the HPLC module.

The diagnosis data may include information about at least one item selected from the group consisting of: pressure, chromatographic behavior, peak dispersion, flow through time, flow rate, a source of contamination, carryover or artifact peaks on a chromatographic column, HPLC module delay volume, a performance of an injector of the HPLC module, a performance of a pump of the HPLC module, a performance of a detector module of the HPLC module, a baseline noise, and a drift. Thus, various information may be provided.

The fixation device may be a tool-free device such as a click-in device. Thus, the fixation device is easy to operate and not error prone due to variations in the installation process for the column device.

The diagnosis process may be a computer-implemented method. For example, the automatic analyzer may comprise an input device such as a keyboard allowing a user to input a start or confirmation command for initiating the diagnosis which is then carried out under control of a computer of the automatic analyzer.

Further disclosed and proposed herein is a computer program including computer-executable instructions for performing the operation method according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one, or even all of the method steps as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: A column device for an automatic analyzer, wherein the automatic analyzer comprises a high performance liquid chromatography (HPLC) module, wherein the HPLC module comprises a fixation device configured to automatically fix and release a chromatographic column, wherein the column device comprises a column jacket and a capillary, wherein the capillary comprises predetermined dimensions and is disposed within the column jacket, wherein the column device is configured to be installed at the HPLC module by means of the fixation device.

Embodiment 2: The column device according to the preceding embodiment, wherein the predetermined dimensions comprise an inner volume and/or backpressure.

Embodiment 3: The column device according to any one of the preceding embodiments, wherein the column device comprises outer dimensions identical to a chromatographic column usable with the HPLC module.

Embodiment 4: The column device according to any one of the preceding embodiments, wherein the capillary comprises an inner diameter of 1 μm to 1000 μm.

Embodiment 5: The column device according to any one of the preceding embodiments, wherein the capillary comprises a length of 10 mm to 50 mm.

Embodiment 6: The column device according to any one of the preceding embodiments, further comprising at least one guiding element configured to insert the column device into the fixation device.

Embodiment 7: The column device according to the preceding embodiment, wherein the guiding element is disposed at an outer surface of the column jacket.

Embodiment 8: The column device according to any one of the preceding embodiments, further comprising a RFID tag, wherein the RFID tag includes information about column type, manufacturing lot and optionally reference values and/or correction factors of the capillary.

Embodiment 9: The column device according to the preceding embodiment, wherein the RFID tag is configured to automatically, typically fully automatically, trigger or enable a diagnosis process of the HPLC module.

Embodiment 10: The column device according to any one of the preceding embodiments, further comprising a human readable label including information about the capillary.

Embodiment 11: An automatic analyzer, comprising a high performance liquid chromatography (HPLC) module, wherein the HPLC module comprises a fixation device configured to automatically fix and release a chromatographic column, and a column device according to any one of the preceding embodiments, wherein the automatic analyzer is configured to carry out a diagnosis process of the HPLC module with the column device fixed by the fixation device.

Embodiment 12: The automatic analyzer according to embodiment 11, wherein the automatic analyzer is configured to provide a flow of and to inject an inert analyte through the capillary.

Embodiment 13: The automatic analyzer according to embodiment 11 or 12, wherein the automatic analyzer is configured to fully automatically carry out the diagnosis process when triggered by the column device.

Embodiment 14: The automatic analyzer according to embodiment 13, wherein the column device comprises a RFID tag, wherein the automatic analyzer further comprises a RFID reader and is configured to carry out the diagnosis process of the HPLC module when identifying the RFID tag.

Embodiment 15: The automatic analyzer according to embodiment 14, wherein a type of diagnosis process depends on information stored by the RFID tag.

Embodiment 16: The automatic analyzer according to any one of embodiments 13 to 15, further comprising a display device configured to display information to a user depending on information stored by the RFID tag.

Embodiment 17: The automatic analyzer according to any one of embodiments 11 to 16, wherein the automatic analyzer is configured to trigger predetermined actions of the HPLC module, particularly release the HPLC module for routine operation, trigger maintenance of the HPLC module, trigger predictive maintenance the HPLC module.

Embodiment 18: The automatic analyzer according to any one of embodiments 11 to 17, wherein the automatic analyzer is configured to automatically evaluate diagnosis data obtained from the diagnosis process.

Embodiment 19: The automatic analyzer according to embodiment 18, wherein the diagnosis data include information about at least one item selected from the group consisting of: pressure, chromatographic behavior, peak dispersion, flow through time, flow rate, a source of contamination, carryover or artifact peaks on a chromatographic column, HPLC module delay volume, a performance of an injector of the HPLC module, a performance of a pump of the HPLC module, a performance of a detector module of the HPLC module, a baseline noise, and a drift.

Embodiment 20: The automatic analyzer according to any one of embodiments 11 to 19, wherein the fixation device is a tool-free device.

In order that the embodiments of the present disclosure may be more readily understood, reference is made to the following examples, which are intended to illustrate the disclosure, but not limit the scope thereof.

FIG. 1 shows a schematic illustration of an automatic analyzer 100 according to an embodiment of the present disclosure. The automatic analyzer 100 comprises a high performance liquid chromatography (HPLC) module 102. The HPLC module comprises a fixation device 104 configured to automatically fix and release a chromatographic column 106. For example, the fixation device 104 can comprise a gripping device or a pair of flanges that can be moved towards one another or away from one another so as to releasably fix the chromatographic column 106. The fixation device 104 can be a tool-free device such as click-in device.

The automatic analyzer 100 further comprises a computer 108 including a processing unit configured to control operation of the automatic analyzer 100 and its components. For example, the fixing and releasing operation of the fixation device 104 may be under control of the computer 108. The fixation device 104 may be operated by an input device of the computer 108 such as a keyboard or graphical interface or the fixation device 104 may be operated by a separate device allowing a user to input a command such as one or more buttons. The automatic analyzer 100 can further comprise an RFID reader 110. The RFID reader 110 can be located at a position adjacent or close to the fixation device 104. Thus, the RFID reader 110 can be capable of reading an RFID tag in its vicinity.

The automatic analyzer 100 can further comprise a display device 112.

FIG. 2 shows a cross-sectional view of a chromatographic column 106 usable with the automatic analyzer 100. The cross-section is taken along a length direction of the chromatographic column 106. The chromatographic column 106 has a circular cross-section. The chromatographic column 106 is filled with adsorbent 114, leading to the separation of sample components of a sample flowing through the chromatographic column 106. The active component of the chromatographic column 106, the adsorbent 114, is typically a granular material made of solid particles (e.g., silica, polymers, etc.), 2-50 μm in size. The components of the sample mixture are separated from each other due to their different degrees of interaction with the adsorbent particles. The pressurized liquid is typically a mixture of solvents (e.g., water, acetonitrile and/or methanol) and is referred to as a mobile phase. As described above, the chromatographic column 106 may be installed at the HPLC module 102 using the fixation device 104.

FIG. 3 shows a cross-sectional view of a column device 116. As will be explained in further detail below, the column device 116 is configured to be used with the HPLC module 102 of the analytic analyzer 100. The column device 116 comprises a column jacket 118 and a capillary 120 disposed within the column jacket 118. The capillary 120 comprises an inner diameter 122 of 1 μm to 1000 μm. The capillary 120 comprises a length 124 of 10 mm to 50 mm. The capillary 120 comprises predetermined dimensions. The predetermined dimensions comprise an inner volume, and/or backpressure.

The column device 116 is configured to be installed at the HPLC module 102 using the fixation device 104. For this purpose, the column device 116 comprises outer dimensions identical to a chromatographic column 106 usable with the HPLC module 102 such as the chromatographic column 106 shown in FIG. 2. In order to facilitate the installation of the column device 116 at the HPLC module 102, the column device 116 further comprises at least one guiding element 126 configured to insert the column device 116 into the fixation device 104. The guiding element 126 is disposed at an outer surface 128 of the column jacket 118.

The column device 116 further comprises an RFID tag 130. The RFID tag 130 includes information about column type, manufacturing lot and optionally reference values and/or correction factors of the capillary 120. The RFID tag 130 is configured to automatically, typically fully automatically, trigger or enable a diagnosis process of the HPLC module 102. The RFID tag 130 may be provided at the outer surface 128 of the column jacket 118 in order to allow the RFID reader 110 of the automatic analyzer 100 to read the RFID tag 130 and the information stored therein. The column device 116 may optionally further comprise a human readable label 132 including information about the capillary 120, such as dimensions of the capillary 120.

The automatic analyzer 100 is configured to carry out a diagnosis process of the HPLC module 102 with the column device 116 fixed by the fixation device 104. With other words, the automatic analyzer 100 is configured to carry out a diagnosis process of the HPLC module 102 when the column device 116 is inserted into the fixation device 104. The automatic analyzer 100 is configured to fully automatically carry out the diagnosis process when triggered by the column device 116. The automatic analyzer 100 is configured to carry out the diagnosis process of the HPLC module 102 when identifying the RFID tag 130 using the RFID reader 110. A type of diagnosis process depends on information stored by the RFID tag 130. Particularly, the automatic analyzer 100 is configured to provide a flow of and to inject an inert analyte through the capillary 120. The automatic analyzer 100 is further configured to automatically evaluate diagnosis data obtained from the diagnosis process. The diagnosis data can include information about at least one item selected from the group consisting of: pressure, chromatographic behavior, peak dispersion, flow through time, flow rate, a source of contamination, carryover or artifact peaks on a chromatographic column, HPLC module delay volume, a performance of an injector of the HPLC module 102, a performance of a pump of the HPLC module 102, a performance of a detector module of the HPLC module 102, a baseline noise, and a drift. The evaluation of the diagnosis data may be carried out by means of the computer 100 comprising a corresponding software and/or evaluation algorithm.

The display device 112 is configured to display information to a user depending on information stored by the RFID tag 130. Further, the automatic analyzer 100 is configured to trigger predetermined actions of the HPLC module 102, such as release of the HPLC module 102 for routine operation, trigger maintenance of the HPLC module 102, and/or trigger predictive maintenance the HPLC module 102.

Hereinafter, an example for the automatic analyzer 100 and the column device 116 will be described in further detail. It has to be noted that the following explanations are merely an example and do not represent a limitation of the embodiments described herein. A system extra column volume of the automatic analyzer 100 and the HPLC module 102, respectively, may be in the range of 15 to 30 μL. The column device 116 using a capillary 120 having a length 124 of 50 mm given by system design and an inner diameter 122 of 100 μm with ±10% inner diameter precision would have a volume of 0.39±0.09 μL and therefore be suited. Volume variances could easily be determined during manufacturing and stored as correction factors in the RFID tag 130. This process would facilitate measurement with higher precision if necessary. In case the pump shall work in its operational pressure optimum, a capillary 120 with 50 mm length 124 and 0.04 mm inner diameter 122 would add a backpressure of approximately 94 bar. In total, the system or HPLC module 102 would operate between 150 and 200 bar facilitating optimal results. An optimal dimension of the capillary 120 is provided due to standardized components and a precisely known liquid chromatography flow path.

Hereinafter, an example for the operation of the automatic analyzer 100 and the column device 116 will be described in further detail. In a normal operation state, a chromatographic column 106 is present in the HPLC module 102 and held in its position by the fixation device 104. If a check of the HPLC module 102 is intended, for example due to a required maintenance or due to a routine check, the user operates the fixation device 104 so as to release the chromatographic column 106. For example, the user enters a command at the computer 108 or pushes a button at the fixation device 104. The fixation device 104 opens and the user may take the chromatographic column 106 out of the fixation device 104.

Subsequently, the user inserts the column device 116 into the fixation device 104 which is facilitated by means of the guiding element 126. In order to assist the user determine whether it is the correct or intended column device 116, the column device 116 can comprise the label 132 including information about the capillary 120, such as dimensions of the capillary 120, which can be read by the user. Further, the user operates the fixation device 104 so as to fix the column device 116. For example, the user can enter a command at the computer 108 or push a button at the fixation device 104. The fixation device 104 closes and the column device 116 is fixed by the fixation device 104. Subsequently, the RFID reader 110 reads the RFID tag 130 provided at the outer surface 128 of the column device 116. The reading operation of the RFID reader 110 may be automatically triggered by the fixation operation of the fixation device 104. Alternatively, the reading operation of the RFID reader 110 can be triggered by the user who enters a command at the computer 108 or pushes a button at the RFID reader 110.

The automatic analyzer 100 can fully automatically carry out the diagnosis process when triggered by the column device 116. Particularly, as soon as the RFID reader 110 has read the information stored by the RFID tag 130 of the column device 116, the automatic analyzer 100 carries out the diagnosis process of the HPLC module 102. As mentioned above, the type of diagnosis process depends on information stored by the RFID tag 130. Particularly, the automatic analyzer 100 is configured to provide a flow to and to inject an inert analyte through the capillary 120 for the purpose of diagnosis. After the diagnosis process, the automatic analyzer 100 automatically evaluates the diagnosis data obtained from the diagnosis process. The diagnosis data include information about at least one item selected from the group consisting of: pressure, chromatographic behavior, peak dispersion, flow through time, flow rate, a source of contamination, carryover or artifact peaks on a chromatographic column, HPLC module delay volume, a performance of an injector of the HPLC module 102, a performance of a pump of the HPLC module 102, a performance of a detector module of the HPLC module 102, a baseline noise, and a drift. The evaluation of the diagnosis data is carried out by means of the computer 100 comprising a corresponding software and/or evaluation algorithm. Alternatively, the evaluation of the diagnosis data may be carried out by an external computer communicating with the automatic analyzer 100.

LIST OF REFERENCE NUMBERS

100 automatic analyzer
102 HPLC module
104 fixation device
106 chromatographic column
108 computer
110 RFID reader
112 display device
114 adsorbent
116 column device
118 column jacket
120 capillary
122 inner diameter
124 length

126 guiding element
128 outer surface
130 RFID tag
132 label

What is claimed is:

1. A column device for an automatic analyzer, wherein the automatic analyzer comprises a high performance liquid chromatography (HPLC) module, wherein the HPLC module comprises a fixation device configured to automatically fix and release a chromatographic column, wherein the column device comprises a column jacket and a capillary, wherein the capillary comprises predetermined dimensions and is disposed within the column jacket, wherein the column device is configured to be installed at the HPLC module using the fixation device, and wherein the column device does not include, and/or is separate from, the chromatographic column.

2. The column device according to claim 1, wherein the predetermined dimensions comprise an inner volume and/or backpressure.

3. The column device according to claim 1, wherein the column device comprises outer dimensions identical to the chromatographic column usable with the HPLC module.

4. The column device according to claim 1, wherein the capillary comprises an inner diameter of 1 μm to 1000 μm.

5. The column device according to claim 1, wherein the capillary comprises a length of 10 mm to 50 mm.

6. The column device according to claim 1, further comprising at least one guiding element configured to insert the column device into the fixation device.

7. The column device according to claim 6, wherein the guiding element is disposed at an outer surface of the column jacket.

8. The column device according to claim 1, further comprising a RFID tag, wherein the RFID tag includes information about column type, manufacturing lot, reference values and/or correction factors of the capillary.

9. An automatic analyzer comprising a high performance liquid chromatography (HPLC) module, wherein the HPLC module comprises a fixation device configured to automatically fix and release a chromatographic column, and a column device according to claim 1, wherein the automatic analyzer is configured to carry out a diagnosis process of the HPLC module with the column device fixed by the fixation device.

10. The automatic analyzer according to claim 9, wherein the automatic analyzer is configured to provide a flow of and to inject an inert analyte through the capillary.

11. The automatic analyzer according to claim 9, wherein the automatic analyzer is configured to fully automatically carry out the diagnosis process when triggered by the column device.

12. The automatic analyzer according to claim 11, wherein the column device comprises a RFID tag, wherein the automatic analyzer further comprises a RFID reader and is configured to carry out the diagnosis process of the HPLC module when identifying the RFID tag.

13. The automatic analyzer according to claim 12, wherein a type of diagnosis process depends on information stored by the RFID tag.

14. The automatic analyzer according to claim 11, further comprising a display device configured to display information to a user depending on information stored by the RFID tag.

15. The automatic analyzer according to claim 9, wherein the automatic analyzer is configured to trigger predetermined actions of the HPLC module.

16. The automatic analyzer according to claim 15, wherein the predetermined actions of the HPLC module include releasing the HPLC module for routine operation, triggering maintenance of the HPLC module, and/or triggering predictive maintenance the HPLC module.

17. The column device according to claim 1, wherein the column device is a dummy column that mimics the chromatographic column and is not configured to separate components of a mixture.

18. The column device according to claim 17, wherein the column device is a measurement tool to guide installation of the chromatographic column.

19. The automatic analyzer according to claim 9, wherein the column device is a dummy column that mimics the chromatographic column and is not configured to separate components of a mixture.

20. The automatic analyzer according to claim 19, wherein the column device is a measurement tool to guide installation of the chromatographic column.

* * * * *